United States Patent Office 2,806,879
Patented Sept. 17, 1957

2,806,879
PREPARATION OF DITHIOOXAMIDE

Donald W. Kaiser and Richard P. Welcher, Old Greenwich, Conn., assignors to American Cyanamid Company, New York, N. Y., a corporation of Maine No Drawing. Application July 13, 1954,
Serial No. 443,164

4 Claims. (Cl. 260—551)

The present invention relates to the preparation of dithiooxamide and more particularly to the preparation of this compound from cyanogen and hydrogen sulfide.

In accordance with this invention it has been found that dithiooxamide may be prepared by reacting cyanogen with hydrogen sulfide in an aqueous medium containing a basic catalyst. The compound is not only obtained in high yields but the process is one whereby this important product may be produced on a commercial scale.

The reaction between the cyanogen and hydrogen sulfide is readily carried out in water containing a basic catalyst at a temperature within the range of from about 0° C. to about 100° C., and preferably from about 10° C. to 40° C.

Examples of basic catalysts for the reaction include the alkali metal and alkaline earth metal hydroxides, the alkali metal carbonates, ammonia, and the aliphatic, aromatic and heterocyclic amines. Specific examples of the amines are methylamine, diethylamine, tri-n-propylamine, ethylenediamine, benzylamine, aniline, 1-naphthylamine, p-toluidine, and piperidine. Although the amount of catalyst employed is not critical, the preferred concentration is within the range of from 0.01 N to 1.0 N.

The reactants are preferably employed in the ratio of two moles of hydrogen sulfide to one mole of cyanogen; however, either reactant can be used in excess without affecting the high yield of the product.

The invention is further illustrated, but not limited, by the following examples:

*Example 1*

A five-neck flask equipped with a thermometer, stirrer, two gas-inlet tubes and one outlet tube was charged with 300 cc. of 0.10 N aqueous ammonium hydroxide. 24 g. (0.46 mole) of cyanogen and 30.9 g. (0.91 mole) of hydrogen sulfide were gradually added simultaneously to the aqueous solution maintained at 16°–19° C. during a period of two hours. The orange-colored crystalline product was filtered off, washed with water, and dried at room temperature. The dithiooxamide weighed 49 g., corresponding to a yield of 90% based on the hydrogen sulfide.

*Analyses.*—Theory for $C_2H_4N_2S_2$: N, 23.31%; S, 53.35%. Found: N, 23.23%; S, 53.25%.

*Example 2*

The reaction flask employed in Example 1 was charged with 300 cc. of aqueous 0.15 N sodium hydroxide. 23.5 g. of cyanogen and 25 g. of hydrogen sulfide were gradually added to the aqueous alkaline solution maintained at 15°–20° C. during a period of 1.5 hours. The orange-colored crystals of dithiooxamide were filtered off, washed with water and dried at 20°–25° C. The product weighed 35 g., corresponding to a 79% yield based on the hydrogen sulfide.

*Example 3*

A 0.10 N solution of triethylamine, prepared from 3 g. of triethylamine and 297 cc. of water, was cooled to 15° C. and added to the reaction flask employed in Example 1. 14.5 g. of cyanogen and 16 g. of hydrogen sulfide were passed into the aqueous solution maintained at 13°–18° C. during a period of one hour. The orange-colored precipitate was filtered off, washed with water, and dried at 100° C. The dithiooxamide weighed 22.3 g. (79% yield based on the hydrogen sulfide).

*Example 4*

The reaction flask employed in Example 1 was charged with a solution consisting of 297 cc. of water and 2.8 g. of aniline. 14 g. of cyanogen and 16 g. of hydrogen sulfide were gradually added simultaneously to the solution maintained at 15°–18° C. during a period of one hour. The orange-colored crystalline precipitate was filtered off, washed with water, and dried at room temperature. 22.4 g. of dithiooxamide was obtained.

One of the outstanding advantages in the preparation of dithiooxamide in accordance with this invention is the high yield of the product which is obtained without the formation of any appreciable amount of side reactions. The compound is collected in subsantially pure form, and thus expensive purification steps are eliminated.

While the invention has been described with particular reference to specific embodiments, it is to be understood that it is not be limited thereto but is to be construed broadly and restricted solely by the scope of the appended claims.

We claim:

1. An improved method of producing substantially pure dithiooxamide which consists in: providing an aqueous alkaline menstruum consisting of water and sufficient basic catalyst to establish a concentration within the range of from about 0.01 normal to about 1 normal; simultaneously introducing a gaseous mixture of cyanogen and hydrogen sulfide to said aqueous alkaline menstruum; maintaining a reaction temperature within the range of from about 0° C. to about 100° C.; and collecting substantially pure, orange precipitate of dithiooxamide from the resultant reaction mixture.

2. The method of claim 1 wherein the cyanogen and hydrogen sulfide are employed in the ratio of two moles of hydrogen sulfide to one mole of cyanogen.

3. The method of claim 1 wherein the catalyst is ammonia.

4. The method of claim 1 wherein the temperature is maintained between 10° C. and 40° C.

References Cited in the file of this patent

UNITED STATES PATENTS

| | | |
|---|---|---|
| 2,484,257 | Watson | Oct. 11, 1949 |
| 2,732,401 | De la Mater | Jan. 24, 1956 |

OTHER REFERENCES

"Chemical Abstracts," vol. 42 (1948), p. 4488.

Woodburn et al.: "J. Org. Chem.," vol. 17 (1952), page 374.

Formanek: "Ber. deut. Chem.," vol. 22 (1889), pp. 2655–2656.